(12) United States Patent
Graham et al.

(10) Patent No.: US 8,503,053 B2
(45) Date of Patent: Aug. 6, 2013

(54) PRECISION SCAN SPHERE

(75) Inventors: Charles D. Graham, Cedar Hill, MO (US); William O. Hubbs, Cedar Hill, MO (US)

(73) Assignee: Hubbs Machine & Manufacturing, Inc., Cedar Hill, MO (US)

(*) Notice: Subject to any disclaimer, the term of this patent is extended or adjusted under 35 U.S.C. 154(b) by 118 days.

(21) Appl. No.: 13/065,047

(22) Filed: Mar. 11, 2011

(65) Prior Publication Data
US 2011/0235143 A1 Sep. 29, 2011

Related U.S. Application Data

(60) Provisional application No. 61/340,994, filed on Mar. 25, 2010, provisional application No. 61/336,520, filed on Jan. 22, 2010.

(51) Int. Cl.
*G02B 26/08* (2006.01)

(52) U.S. Cl.
USPC ........................................... 359/200.1

(58) Field of Classification Search
USPC .............. 359/200.1, 515, 516, 520, 522, 813, 359/822
See application file for complete search history.

(56) References Cited

U.S. PATENT DOCUMENTS

| | | | |
|---|---|---|---|
| 5,073,005 A | 12/1991 | Hubbs | |
| 7,014,325 B2 | 3/2006 | Hubbs | |
| 7,110,194 B2 | 9/2006 | Hubbs | |
| 7,204,024 B2 | 4/2007 | Hubbs | |
| 7,285,793 B2 * | 10/2007 | Husted | .......................... 250/577 |
| 7,609,439 B2 | 10/2009 | Hubbs | |

* cited by examiner

*Primary Examiner* — Euncha Cherry
(74) *Attorney, Agent, or Firm* — Paul M. Denk

(57) ABSTRACT

A precision scan sphere designed for use in conjunction with scanner technology, and includes a full or partial sphere, having a laser detecting surface, and which can be mounted by a shank into a holder, or held by a steel insert that may be applied to a sphere mount, during its application and usage. Because of the reduction and size of the insert, as applied to the bottom of the scan sphere, as an example, a 2.375 inch diameter sphere can mount directly to a 1.5 inch sphere mount, during its application and usage.

7 Claims, 3 Drawing Sheets

PRECISION SCAN SPHERE

CROSS REFERENCE TO RELATED APPLICATION

This provisional patent application claims priority to the provisional patent application having Ser. No. 61/340,994, having a filing date Mar. 25, 2010; and claims priority to the provisional patent application having Ser. No. 61/336,520, having filing date Jan. 22, 2010.

FIELD OF THE INVENTION

This invention pertains to a precision scan sphere, generally of the type that is used in conjunction with a laser scanner, wherein the scanning portion of the sphere having a surface conducive to laser scanning, which may be of a dull white finish or other finish, color, or texture, appropriate for a particular Laser Scanning system in turn allows the laser scanner to find the apex of the sphere which then provides a representation of the location positioning of the sphere. The precision scan sphere has tolerances that allows for this to be used for accurate feature locations. But, in addition, the concept of this invention, and its adaptor of usage, allows the scan sphere to accurately locate in a 1.5" sphere mount. By adapting to a 1.5" sphere mount the scan sphere can use the same points used by other metrology systems.

BACKGROUND OF THE INVENTION

There are a variety of reflective means that are utilized in metrology systems, wherein spheres are used with laser trackers, and other tracking systems, typically employed in industrial applications to provide for precision setting of technological components. Examples of these can be seen in the applicants' prior patents, such as the Retro-Reflective Photogrammetric Target, U.S. Pat. No. 5,073,005, which describes the use of a reflective member for use as a target in photogrammetry and automatic theodolite systems. U.S. Pat. No. 7,014,325, discloses a Displacement Process for Hollow Surveying Retroreflector. U.S. Patent No. 7,110,194, discloses a Spherical Retro-Reflector Mount Negative, which includes a sphere mount for mounting a retro-reflector for use for deflecting a laser during precision installations. The patent upon a Track and Punch SMR Marking Device, U.S. Pat. No. 7,204,024, that provides for the precise marking of an SMR location. U.S. Pat. No. 7,609,439, discloses a Mask Overlay for Infrared Target Assembly, and it is used as an infrared target for use for setting the location of any instrument, assembly, machinery, or component to be machined, during industrial applications. These are examples of the types of sphere means, and their mounts or reflective surfaces, that have been designed and developed by the assignee Company of this and other related inventions.

The concept of this current invention is to improve upon some of these prior tracking systems, and which makes them readily available for industrial application particularly in the manufacture of heavy equipment, or even assembly line applications, wherein both tooling and the parts to be worked must have precise setting, at very close tolerance applications.

SUMMARY OF THE INVENTION

This invention relates to scanning technology, used in the metrology industry, and more particularly to the scanning spheres that are used in the scanning technology art.

In addition, the concept of this invention is to provide a spherical type item that is conducive to scanning that also offers precision tolerances of the sphere. By holding a tolerance of the sphere and its features it allows for the precise location of the sphere to be determined when scanned. The location can be determined by the scanners ability to find the apex of the sphere, and calculate to represent its center.

More specifically, this invention relates to the construction of a sphere, having an outer surface that can be recognized by laser scanner or any other scanning device that would recognize these types of shapes, reflectivity or dullness, color or texture. The sphere has a significant diameter that provides adequate surface area and size of spherical radius for scanning during application. The sphere can be made from any material. One requirement is that the surface is conducive to scanning. This can be obtained by choosing a material that is conducive to scanning or by applying a coating that is conducive to scanning.

In one embodiment, the scan sphere is comprised of two different sized radiuses' that share the same center point. One radius is large enough to provide enough surface area and large enough spherical radius to be conducive to scanning; the other radius shall be one that matches that of any size SMR used with a Laser Tracker. Common sizes today are 1.5, 0.875, and 0.500 diameters. The radius that matches the SMR either part or whole is attracted to a magnet. This embodiment allows for the scan sphere to accurately locate in a Sphere Mount Target Holder such as HUBBS SM Series Sphere Mounts. When the Precision Scan Sphere is placed in a sphere mount target holder the scan sphere will share the same center points as that of an SMR used for Laser Trackers or other partial spherical targets used with other measurement systems. This again allows for the Scan Sphere to share the same points used in conjunction with other metrology systems.

Another embodiment, the Precision Scan Sphere has a shank to fit a specific hole that is concentric to the Scan Sphere and has a known offset from the shoulder to the center of the Scan Sphere. This embodiment allows for a hole location to be accurately measured or represented by the laser scanner of other scanning devices. As with other targets or adaptors, many variations are possible.

These and other objects may become more apparent to those skilled in the art upon review of the summary of invention as provided herein, and upon undertaking a study of the description of its preferred embodiment, in view of the drawings.

DESCRIPTION OF THE PREFERRED EMBODIMENT

Figure 1:
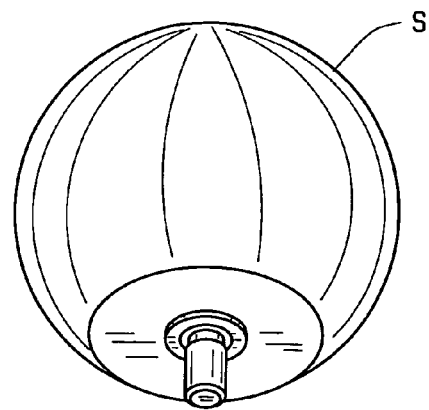
FIG. 1 provides an isometric view of the scan sphere of this invention.
Figure 2:
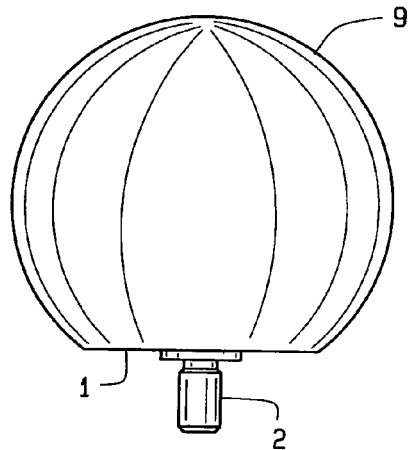
FIG. 2 is a side view thereof, showing its lower shank for use for mounting purposes.
Figure 3:
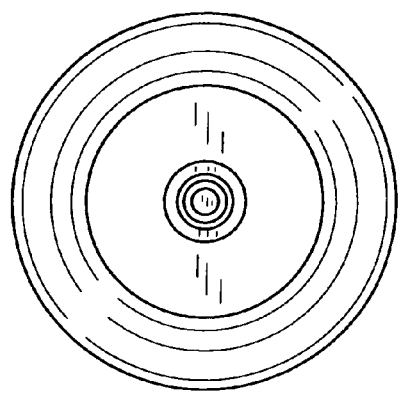
FIG. 3 is a bottom view of the sphere of FIG. 1.

In referring to the drawings, FIG. 1, as previously noted, provides a view of a sphere, for use for receiving a laser beam, when used in conjunction with a laser scanner. As noted, the scan sphere S includes a flattened base, as at 1, and has a shank 2 extending downwardly therefrom, and which is either inserted partially within a bore at the lower center of the sphere S, or otherwise secured.

Figure 4:
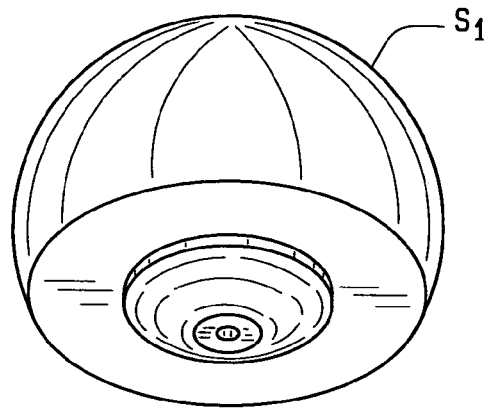
FIG. 4 is an isometric view of the scan sphere with an insert for use for magnetic mounting of said sphere in a sphere mount.
Figure 5:
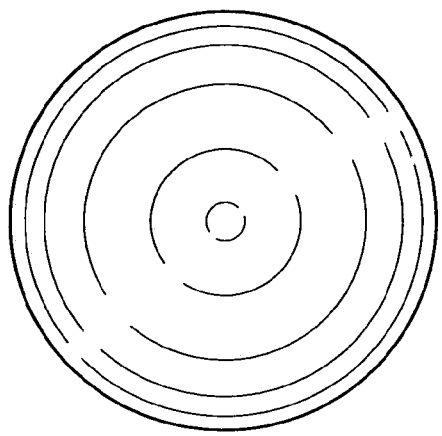
FIG. 5 is a top plan view.

FIG. 4 shows a scan sphere S1 as an example, and to which an insert 4 connects in the bore in the center of the 0.75 spherical radius. The steel insert does have a tapped hole for manufacturing purposes, but the function of the steel insert is to allow the lower radius to mount and attract magnetically onto a magnetic sphere mount known in the art giving the same center line of a 1.5 sphere, in the 2.375 inch diameter sphere installation.

The precision scan sphere is designed to be used in conjunction with scanner technology such as, but not limited to 3D laser scanners. The precision scan sphere is larger than a 1.500" diameter sphere. The 1.500" diameter is one of the common size sphere used in the metrology industry. There are a wide variety of various tooling that will accept 1.500" sphere.

The larger diameter sphere has more surface area for the laser scanner to get a reading from. It can be made from any material. The only important features are that the surface must be one that is conducive to scanning, often non-reflective as aforesaid, it offers the same critical offsets as a 1.500 sphere when held in tooling designed for a 1.500 sphere, and it must be able to have enough magnetic attraction to stay in the mount designed for the 1.500 sphere. Other options of the precision scan spheres are designed to adapt to various tooling or features on the object needing to be measured. Some of the same important features will apply a surface that is conducive to scanning and critical offsets and tolerances will be held.

The purpose of one precision scan sphere is to have a sphere that fits into a 1.5" sphere mount but offers more surface area than a standard 1.500" sphere when placed in said 1.5" sphere mount (typically 1.0" or 25 mm). This allows for the user to utilize the same tooling already in place for 1.500" spheres used with laser trackers and other metrology systems. The tolerances are yet to be determined.

Figure 6:
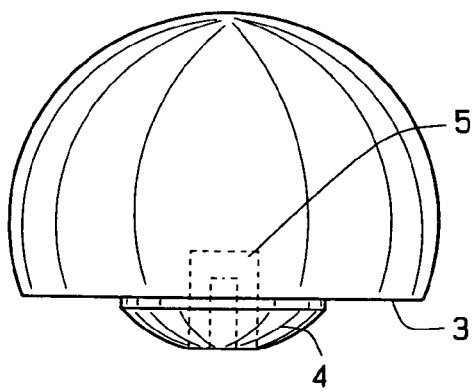
FIG. 6 is a side view.
Figure 7:
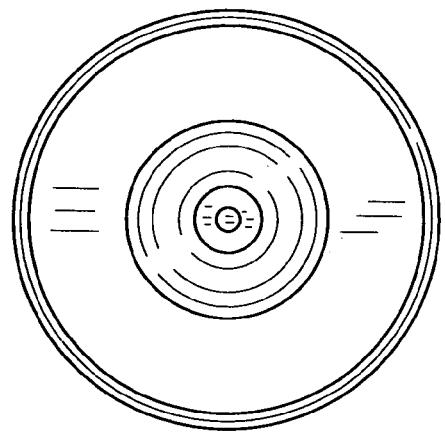
FIG. 7 is a bottom plan view.

Another concept of this invention, as can be noted in FIG. 6, is that a 2.375 inch diameter sphere, more or less, provides obviously greater surface area than the standard 1.5 inch diameter sphere, but at the same time, because it utilizes a sphere mount that can support a 1.5 inch sphere, through the usage of the insert 4, as previously described, allows the magnetic mounting of a large sphere, in a lesser size mount, thereby increasing the surface area of the sphere surface for detecting, but at the same time, allows the standard mount, that may already be in place, to function as a sphere mount for holding of the larger sphere in place.

There can and will be many varieties of the precision scan sphere. Some will offer a shank 5, some may have a hole. Some may offer a tapped shank or a tapped hole. Some may have a cut out that allows it to sit on a corner. Some may use the identified insert for mounting purposes. The factors that make it a precision scan sphere are that it must have a surface and the surface area that can be scanned. The sphere will have fairly close tolerances and offer some of the offsets currently used for other metrology systems. The basic idea is to have a set of spheres that allows the scanner to check the same points as a laser tracker or other metrology systems using precision scan spheres. This allows for data to be gathered using multiple systems at the same points.

Figure 8:
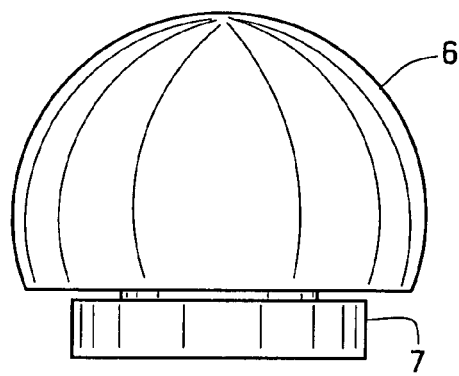
FIG. 8 provides a view of the scan sphere of this invention mounted upon its sphere mount.
Figure 9:
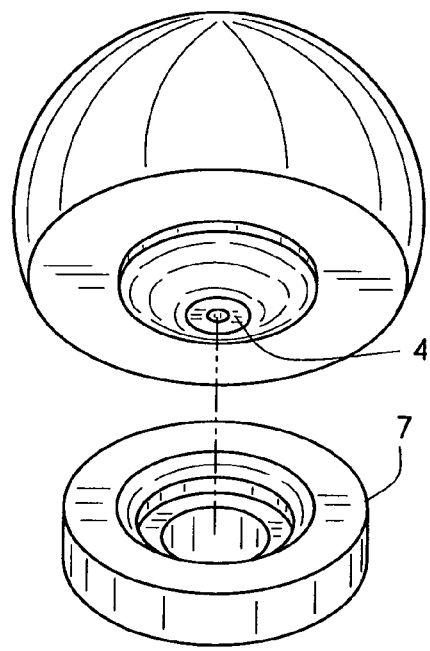
FIG. 9 shows a separated view of the scan sphere held above its sphere mount.

FIG. 8 shows a non-reflective scan sphere of the type that the scanning portion of the sphere having a surface conducive to laser scanning, which may be of a dull white finish or other finish, color, or texture, appropriate for a particular Laser Scanning system, but will have a larger diametric size than the regular 1.5" sphere. As noted, the scan sphere 6 is mounted to its sphere mount 7 and while the sphere mounts is normally of the type that can accommodate the mounting of a 1.5" sphere, in place. In this instance, FIG. 8 represents the 2.375 diameter, more or less as an example, partial sphere mounted in a sphere mounted designed to hold a 1.500 sphere while at the same time both partial diameters share the same center point.

Figure 10:
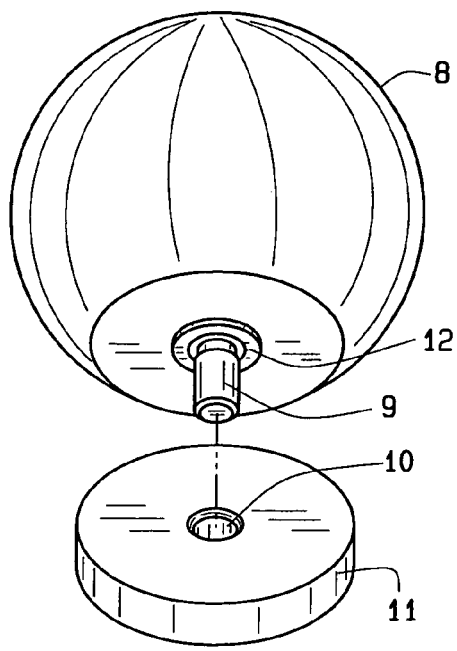
FIG. 10 shows the non-reflective scan sphere held by its shank within its sphere mount.

FIG. 10 shows a scan sphere 8 that has a shank 9 extending downwardly therefrom, and which locates precisely within the aperture 10 of the shown mount 11. Thus, any diameter shank up to a reasonably size diameter can be manufactured on the Scan Sphere. The type of partial sphere shown herein, in addition to that disclosed in FIG. 8, wherein the scanning portion of the sphere having a surface conducive to laser scanning, which may be of a dull white finish or other finish, color, or texture, appropriate for a particular Laser Scanning system.

Variations or modifications to the subject matter of this invention may occur to those skilled in the art upon review of the summary of the invention as provided herein, and upon undertaking a study of the description of its preferred embodiment. Such variations, if within the scope of this development or intended to be encompass within any claims to patent protection provided herein. The explanation of the invention in the specification, and its depiction in the drawings, are set forth for illustrative purposes only.

We claim:

1. A precision scan sphere designed to be used in conjunction with scanner technology, comprising:
    a partial sphere, said partial sphere having a flattened bottom, said sphere having a vertical center line located through the center of said partial sphere;
    a shank, said shank connected to the flattened bottom of said sphere and extending downwardly in alignment with the center line of said partial sphere;
    a mount, said mount having a central aperture provided at least partially therethrough, said mount aperture provided in alignment with the vertical center line of said partial sphere when said partial sphere is arranged upon said mount; and
    wherein when said partial sphere is located upon said mount during a precision scan, said shank locates within said mount aperture and maintains the vertical alignment of said partial sphere, its shank, and said mount during a scanning procedure.

2. The precision partial scan sphere of claim 1 wherein the partial scan sphere is opaque and non-reflective at its surface.

3. The precision partial scan sphere of claim 1 wherein the surface of the partial sphere is reflective.

4. A precision scan sphere designed to be used in conjunction with scanner technology, comprising:
    a partial sphere, said partial sphere having a flattened bottom, said sphere having a vertical center line located through the center of said partial sphere;
    a curved insert, said curved insert having a flattened upper surface, said flattened upper surface of said curved insert provided for contiguously contacting said flattened bottom of said partial sphere when the curved insert is secured with the flattened bottom of said partial sphere, a shank means connecting within the flattened upper surface of said curved insert and provided for locating within the flattened bottom of said partial sphere and to maintain the vertical alignment of said curved insert with said partial sphere when used during scanning; and a mount, said mount having a circular seat formed upon its upper surface, and said mount providing for seating said curved insert and to maintain the vertical alignment between said partial sphere, curved insert, and said mount during a scanning process.

5. The precision scan sphere of claim 4 wherein said mount is magnetic, and magnetically holds the curved insert within its seat during a scanning process.

6. The precision partial scan sphere of claim 4 wherein the partial scan sphere is opaque and non-reflective at its surface.

7. The precision partial scan sphere of claim 4 wherein the surface of said partial sphere is reflective.

\* \* \* \* \*